United States Patent
Xie

(10) Patent No.: US 10,964,338 B2
(45) Date of Patent: Mar. 30, 2021

(54) MOOD RECOGNITION METHOD, ELECTRONIC DEVICE AND COMPUTER-READABLE STORAGE MEDIUM

(71) Applicant: BEIJING BAIDU NETCOM SCIENCE AND TECHNOLOGY CO., LTD., Beijing (CN)

(72) Inventor: Bo Xie, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 25 days.

(21) Appl. No.: 16/153,148

(22) Filed: Oct. 5, 2018

(65) Prior Publication Data

US 2019/0198040 A1 Jun. 27, 2019

(30) Foreign Application Priority Data

Dec. 22, 2017 (CN) .......................... 201711404907.4

(51) Int. Cl.
*G10L 25/63* (2013.01)
*G10L 15/22* (2006.01)
(Continued)

(52) U.S. Cl.
CPC .............. *G10L 25/63* (2013.01); *G06F 40/30* (2020.01); *G10L 15/22* (2013.01); *G10L 15/26* (2013.01);
(Continued)

(58) Field of Classification Search
CPC ... G10L 15/22; G10L 25/63; G10L 2015/223; G10L 2015/225; G10L 15/26
See application file for complete search history.

(56) References Cited

U.S. PATENT DOCUMENTS 6,556,972 B1 * 4/2003 Bakis .................... G06F 17/289
704/2
2002/0198707 A1 * 12/2002 Zhou ....................... G10L 17/26
704/231
(Continued)

FOREIGN PATENT DOCUMENTS

CN 1494711 A 5/2004
CN 102231278 A 11/2011
(Continued)

OTHER PUBLICATIONS

Chinese Patent Application No. 201711404907.4, Office Action dated Apr. 15, 2020, 7 pages.
(Continued)

*Primary Examiner* — Samuel G Neway
(74) *Attorney, Agent, or Firm* — Lathrop GPM LLP

(57) ABSTRACT

The present disclosure discloses a mood recognition method, a device, an electronic device and a computer-readable storage medium. The method includes: obtaining a sample text; obtaining a plurality of recordings corresponding to the sample text, in which the plurality of recordings are speech obtained by reading the sample text using a plurality of mood types; extracting a mood feature from each of the plurality of recordings, and determining a mood type corresponding to the mood feature; establishing a mood recognition model based on the sample text, mood features extracted from the plurality of recordings, and mood types corresponding to the mood features; and performing mood recognition on a speech data of a user based on the mood recognition model to obtain a corresponding mood meaning.

3 Claims, 6 Drawing Sheets

(51) Int. Cl.
  *G06F 40/30* (2020.01)
  *G10L 15/26* (2006.01)
  *G10L 15/18* (2013.01)
(52) U.S. Cl.
  CPC .... *G10L 15/1822* (2013.01); *G10L 2015/223* (2013.01); *G10L 2015/225* (2013.01)

(56) References Cited

U.S. PATENT DOCUMENTS

| | | | | |
|---|---|---|---|---|
| 2004/0006464 | A1* | 1/2004 | Geppert | G10L 15/26 704/235 |
| 2006/0122834 | A1* | 6/2006 | Bennett | G10L 15/1822 704/256 |
| 2012/0072217 | A1* | 3/2012 | Bangalore | G10L 15/1807 704/243 |
| 2016/0021249 | A1* | 1/2016 | Govande | H04M 3/4365 455/414.1 |
| 2016/0104486 | A1* | 4/2016 | Penilla | B60R 16/0373 704/232 |
| 2017/0103757 | A1* | 4/2017 | Yamamoto | G10L 15/22 |
| 2019/0138095 | A1* | 5/2019 | Visser | G06F 3/0346 |
| 2019/0198040 | A1* | 6/2019 | Xie | G10L 15/265 |

FOREIGN PATENT DOCUMENTS

| | | |
|---|---|---|
| CN | 104023125 A | 9/2014 |
| CN | 105654950 A | 6/2016 |
| CN | 105929964 A | 9/2016 |
| CN | 107003997 A | 8/2017 |

OTHER PUBLICATIONS

Chinese Patent Application No. 201711404907.4, English translation of Office Action dated Apr. 15, 2020, 7 pages.

* cited by examiner

MOOD RECOGNITION METHOD, ELECTRONIC DEVICE AND COMPUTER-READABLE STORAGE MEDIUM

CROSS-REFERENCE TO RELATED APPLICATION

This application claims priority to Chinese Patent Application No. 201711404907.4, filed with the State Intellectual Property Office of P. R. China on Dec. 22, 2017, the entire content of which is incorporated herein by reference.

FIELD

The present disclosure relates to a field of speech recognition technology, and more particularly to a mood recognition method, an electronic device and a computer-readable storage medium.

BACKGROUND

At present, user's intention may be greatly different because a user reads a text in different moods. For example, for a text "really", the user may read the text in an affirmative mood or in a rhetorical mood. Since the user uses two different moods, corresponding intention of the user may be different. However, in traditional speech recognition technology, only content of the speech of the user can be recognized, but interrogative mood in the speech of the user cannot be recognized.

SUMMARY

A first aspect of embodiments of the present disclosure provides a mood recognition method, including: obtaining a sample text; obtaining a plurality of recordings corresponding to the sample text, in which the plurality of recordings are speech obtained by reading the sample text using a plurality of mood types; extracting a mood feature from each of the plurality of recordings, and determining a mood type corresponding to the mood feature; establishing a mood recognition model based on the sample text, mood features extracted from the plurality of recordings, and mood types corresponding to the mood features; and performing mood recognition on a speech data of a user based on the mood recognition model to obtain a corresponding mood meaning.

A second aspect of embodiments of the present disclosure provides an electronic device, including a memory, a processor, and computer programs stored on the memory and executable by the processor. When the processor executes the computer programs, the processor is caused to perform a mood recognition method, including: obtaining a sample text; obtaining a plurality of recordings corresponding to the sample text, in which the plurality of recordings are speech obtained by reading the sample text using a plurality of mood types; extracting a mood feature from each of the plurality of recordings, and determining a mood type corresponding to the mood feature; establishing a mood recognition model based on the sample text, mood features extracted from the plurality of recordings, and mood types corresponding to the mood features; and performing mood recognition on a speech data of a user based on the mood recognition model to obtain a corresponding mood meaning.

A third aspect of embodiments of the present disclosure provides a non-transitory computer-readable storage medium having computer programs stored thereon. When the computer programs are executed by a processor, the processor is caused to perform a mood recognition method, including: obtaining a sample text; obtaining a plurality of recordings corresponding to the sample text, in which the plurality of recordings are speech obtained by reading the sample text using a plurality of mood types; extracting a mood feature from each of the plurality of recordings, and determining a mood type corresponding to the mood feature; establishing a mood recognition model based on the sample text, mood features extracted from the plurality of recordings, and mood types corresponding to the mood features; and performing mood recognition on a speech data of a user based on the mood recognition model to obtain a corresponding mood meaning.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
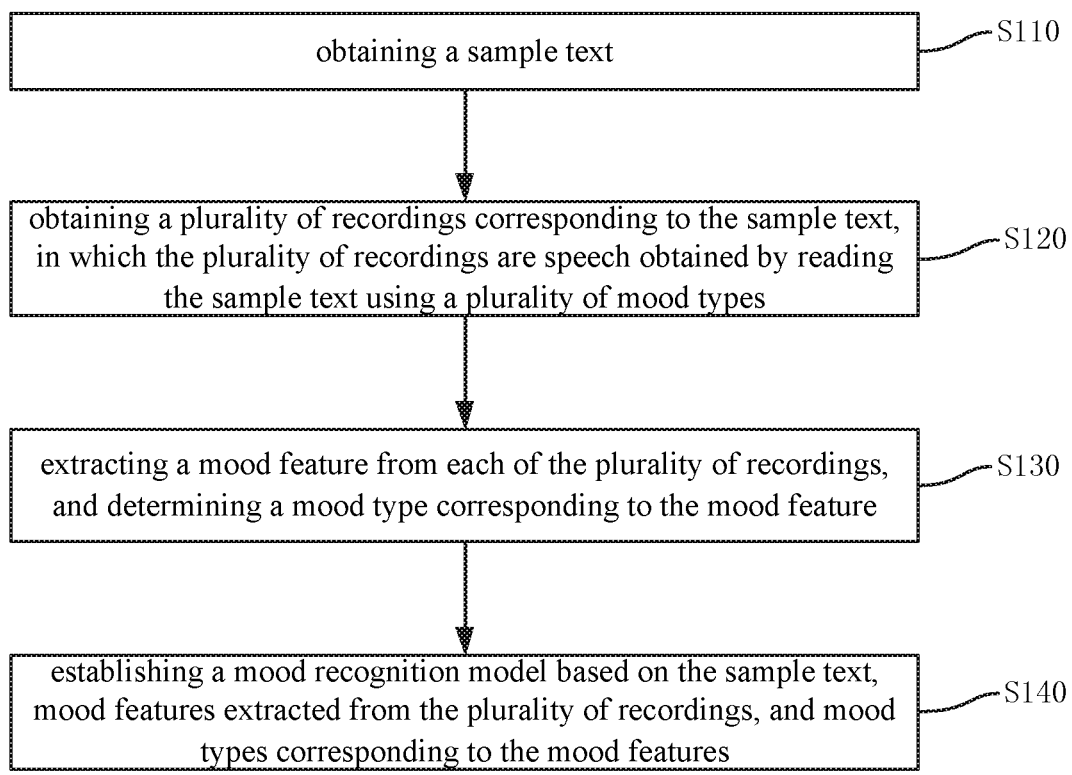
FIG. 1 is a flow chart of a mood recognition method according to an embodiment of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

A mood recognition method and device, an electronic device and a computer-readable storage medium according to embodiments of the present disclosure will be descripted with reference to drawings.

FIG. 1 is a flow chart of a mood recognition method according to an embodiment of the present disclosure. It should be noted that, the mood recognition method according to embodiments of the present disclosure may be applied in the mood recognition device according to embodiments of the present disclosure. The mood recognition device may be configured in the electronic device. The electronic device may be a device having a speech recognition system and able to realize a function of speech recognition.

As illustrated in FIG. 1, the mood recognition method includes follows.

At block S110, a sample text is obtained.

In some embodiments, plenty of sample texts may be collected before a mood recognition model is established. In some embodiments of the present disclosure, the sample text may be understood as a text having different meanings when read in different moods, such as "really", "sorry" "today's weather is well", and the like.

At block S120, a plurality of recordings corresponding to the sample text are obtained. The plurality of recordings are speech obtained by reading the sample text using a plurality of mood types. As an example, the plurality of mood types may include but not limit to an affirmative mood, an interrogative mood, a rhetorical mood and the like.

In some embodiments, after the plenty of sample texts are obtained, a plurality of recordings of each sample text is obtained by a sample user reading each sample using the plurality of mood types. For example, the sample text is "really". A first speech corresponding to the sample text 真的 may be obtained when the sample user reads the sample text "really" in the affirmative mood, and a second speech corresponding to the sample text "really" may be obtained when the sample user reads the sample text "really" in the interrogative mood. For another example, the sample text is "today's weather is well". A first speech corresponding to the sample text "today's weather is well" may be obtained when the sample user reads the sample text "today's weather is well" in the affirmative mood, and a second speech corresponding to the sample text "today's weather is well" may be obtained when the sample user reads the sample text "today's weather is well" in the rhetorical mood. After the speeches for each sample text are obtained, the speeches for each sample text may be regarded as the recordings of the corresponding sample text.

At block S130, a mood feature is extracted from each of the plurality of recordings, and a mood type corresponding to the mood feature is determined.

In some embodiments, after the plurality of recordings corresponding to the sample text are obtained, the mood feature of each recording may be extracted, and the mood type corresponding to the mood feature is determined. In some embodiment of the present disclosure, the mood type may include but not limit to the affirmative mood, the interrogative mood and the rhetorical mood.

It should be noted that, the moods contained in the recordings of the sample text obtained by reading the sample text in different mood types may be different, thus semantic meanings corresponding to the recordings are different. Words representing moods are generally locate at the end of a sentence or at a pause of the sentence so as to represent various moods. As an example, an audio representing moods and located at a pause of a sentence or at the end of the sentence in a recording may be extracted, and features of the audio may be extracted. For example, the features may include an intonation, such as a rising intonation, a falling intonation, a rising-falling intonation, a falling-rising intonation and an even intonation.

At block S140, a mood recognition model is established based on the sample text, mood features extracted from the plurality of recordings, and mood types corresponding to the mood features.

In some embodiments, the sample text may be labeled based on the mood features of each recording and corresponding mood types, and a classifier is trained by taking labeled data as input to obtain the mood recognition model. In some embodiments of the present disclosure, the classifier may include but not limit to a SVM (support vector machine) classifier, a KNN (K-nearest Neighbour) classifier, a decision tree classifier, or the like.

With the mood recognition method according to an embodiment of the present disclosure, the plurality of recordings may be obtained by reading the sample text using the plurality of mood types, the mood feature is extracted from each of the plurality of recordings, and the mood type corresponding to the mood feature is determined, finally, the mood recognition model is established based on the sample text, the mood features extracted from the plurality of recordings, and the mood types corresponding to the mood features, such that when speech recognition is performed on speech data input by a user in an online application, the mood recognition is performed on the speech data through the pre-established mood recognition model, realizing recognition of various types of moods in speech data, improving effect of the speech recognition, thus improving effect of speech dialogue between human and machine, and improving user experience.

Figure 2:
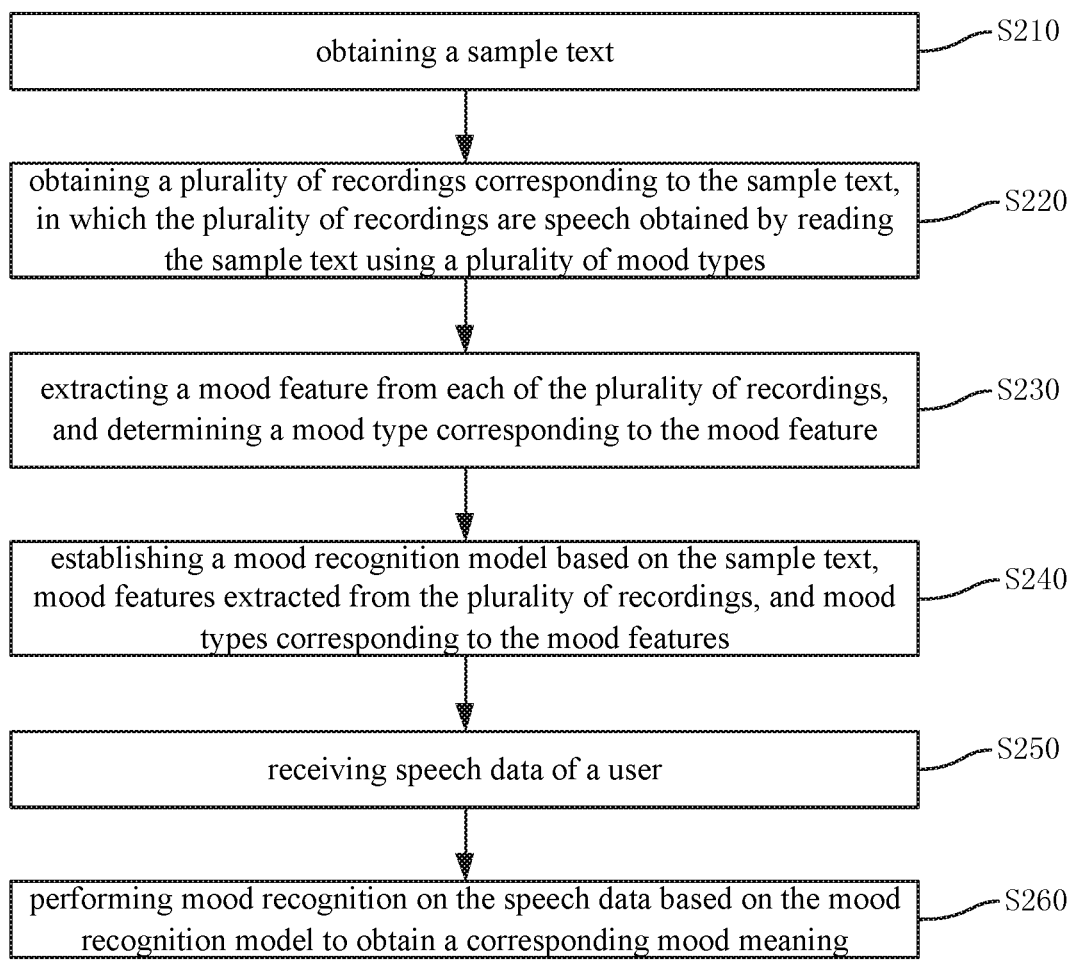
FIG. 2 is a flow chart of a mood recognition method according to another embodiment of the present disclosure.

FIG. 2 is a flow chart of a mood recognition method according to yet another embodiment of the present disclosure. As illustrated in FIG. 2, the mood recognition method may include follows.

At block S210, a sample text is obtained.

At block S220, a plurality of recordings corresponding to the sample text are obtained. The plurality of recordings are speech obtained by reading the sample text using a plurality of mood types. As an example, the plurality of mood types may include but not limit to an affirmative mood, an interrogative mood, a rhetorical mood and the like.

At block S230, a mood feature is extracted from each of the plurality of recordings, and a mood type corresponding to the mood feature is determined.

At block S240, a mood recognition model is established based on the sample text, mood features extracted from the plurality of recordings, and mood types corresponding to the mood features.

At block S250, speech data of a user is received.

For example, the mood recognition method according to embodiments of the present disclosure maybe applied in an application scene of a chatting robot. In order to realize a speech chatting function between the user and the chatting robot, the chatting robot may provide a speech inputting module for the user. The user may chat with the chatting robot via the speech inputting module. In this way, in the practical online application, when it is detected that the user chats with the robot, the speech data input by the user via the speech inputting module may be received.

At block S260, mood recognition is performed on the speech data based on the mood recognition model to obtain a corresponding mood meaning.

As an exemplary implementation, the mood recognition is performed on the speech data based on the mood recognition model to obtain the mood type corresponding to the speech data, and the corresponding mood meaning is determined according to the mood type. In other words, mood features are extracted from the speech data firstly, and the mood features and the text corresponding to the speech data are input to the pre-established mood recognition model such that a prediction is performed, and the mood type corresponding to the speech data is obtained. After that, the corresponding mood meaning is determined according to the mood type.

With the mood recognition method according to an embodiment of the present disclosure, the plurality of recordings may be obtained by reading the sample text using the plurality of mood types, the mood feature is extracted from each of the plurality of recordings, and the mood type corresponding to the mood feature is determined, finally, the mood recognition model is established based on the sample text, the mood features extracted from the plurality of recordings, and the mood types corresponding to the mood features, such that when speech recognition is performed on speech data input by a user in an online application, the mood recognition is performed on the speech data through the pre-established mood recognition model, realizing recognition of various types of moods in speech data, improving effect of the speech recognition, thus improving effect of speech dialogue between human and machine, and improving user experience.

Figure 3:
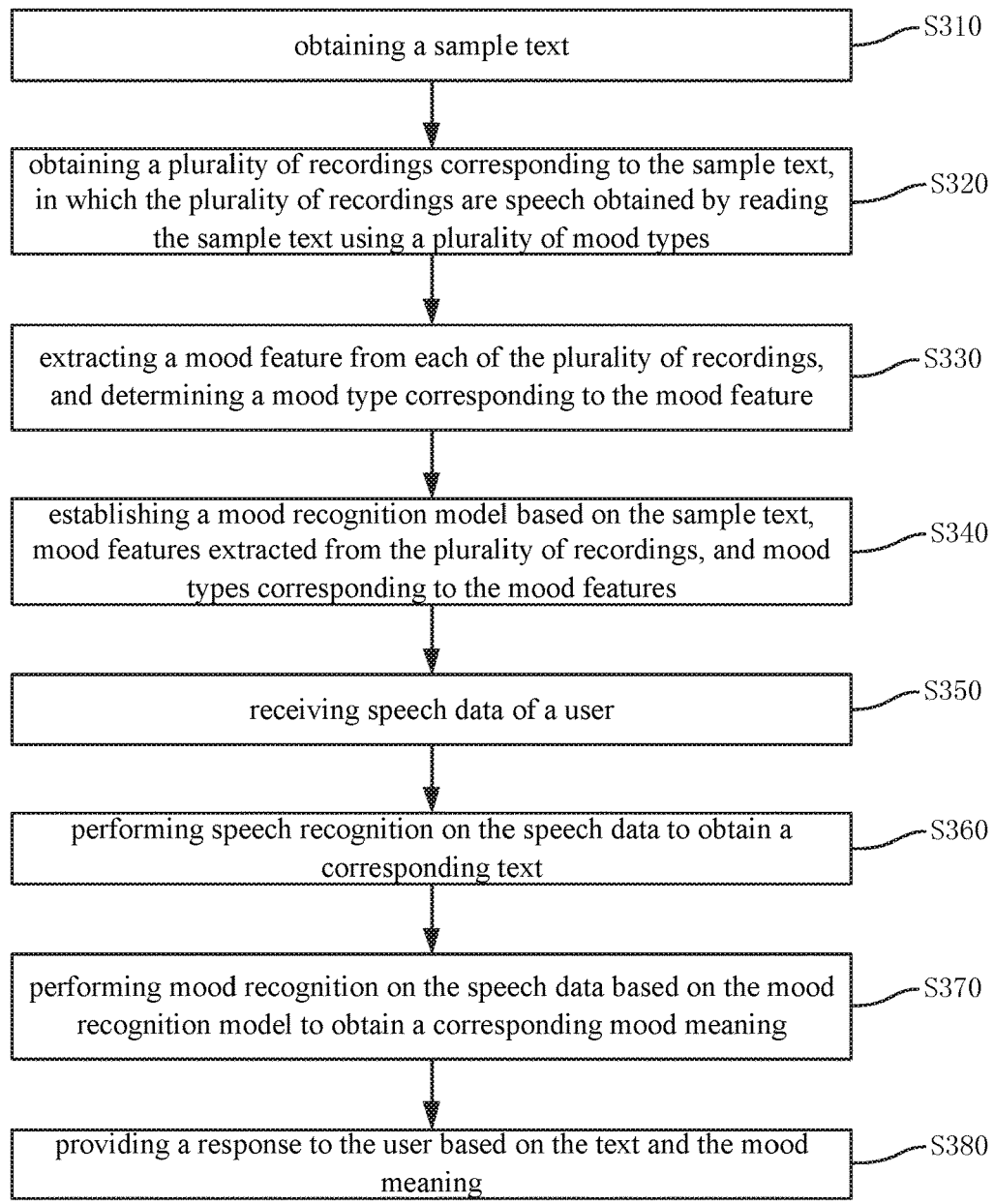
FIG. 3 is a flow chart of a mood recognition method according to yet another embodiment of the present disclosure.
Figure 4:
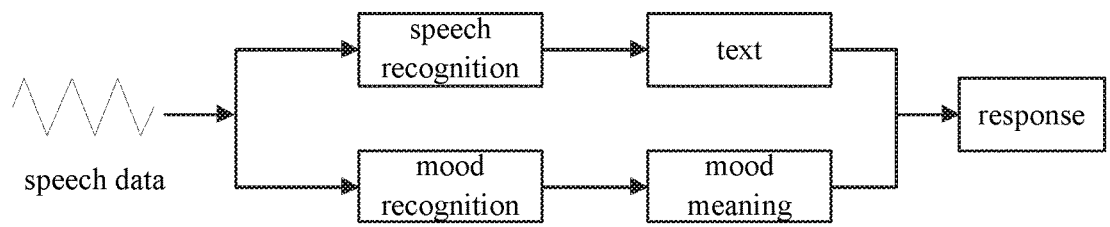
FIG. 4 is a schematic diagram of a mood recognition method according to another embodiment of the present disclosure.

FIG. 3 is a flow chart of a mood recognition method according to yet another embodiment of the present disclosure. FIG. 4 is a schematic diagram of a mood recognition method according to another embodiment of the present disclosure.

In order to further improve availability and feasibility of the present disclosure, in some embodiments of the present disclosure, speech data of a user may be received, mood recognition may be performed on the speech data based on the pre-established mood recognition model at the same time of performing speech recognition on the speech data, and the user is provided with a response based on a result of the speech recognition and a result of the mood recognition, such that the speech dialogue between the human and the machine is more lively. In detail, as illustrated in FIG. 3 and FIG. 4, the mood recognition method may include follows.

At block S310, a sample text is obtained.

At block S320, a plurality of recordings corresponding to the sample text are obtained. The plurality of recordings are speech obtained by reading the sample text using a plurality of mood types. As an example, the plurality of mood types may include but not limit to an affirmative mood, an interrogative mood, a rhetorical mood and the like.

At block S330, a mood feature is extracted from each of the plurality of recordings, and a mood type corresponding to the mood feature is determined.

At block S340, a mood recognition model is established based on the sample text, mood features extracted from the plurality of recordings, and mood types corresponding to the mood features.

At block S350, speech data of a user is received.

For example, the mood recognition method according to embodiments of the present disclosure maybe applied in an application scene of a chatting robot. In order to realize a speech chatting function between the user and the chatting robot, the chatting robot may provide a speech inputting module for the user. The user may chat with the chatting robot via the speech inputting module. In this way, in the practical online application, when it is detected that the user chats with the robot, the speech data input by the user via the speech inputting module may be received.

At block S360, speech recognition is performed on the speech data to obtain a corresponding text.

In some embodiments, when the speech data input by the user is received, the speech recognition may be performed on the speech data through a speech recognition technology to obtain the text corresponding to the speech data.

At block S370, mood recognition is performed on the speech data based on the mood recognition model to obtain a corresponding mood meaning.

As an exemplary implementation, the mood recognition is performed on the speech data based on the mood recognition model to obtain the mood type corresponding to the speech data, and the corresponding mood meaning is determined according to the mood type. In other words, mood features are extracted from the speech data firstly, and the mood features and the text corresponding to the speech data are input to the pre-established mood recognition model such that a prediction is performed, and the mood type corresponding to the speech data is obtained. After that, the corresponding mood meaning is determined according to the mood type.

At block S380, a response is provided to the user based on the text and the mood meaning.

As an exemplary implementation, a user intention may be determined based on the text and the mood meaning, and dialogue content is obtained according to the user intention. Then the dialogue content is provided to the user. That is, the user intention (i.e., detail meaning or mood that the user wants to express) may be determined based on the result of the speech recognition and the result of the mood recognition, and the dialogue content is obtained according to the user intention. Finally, the dialogue content is provided to the user.

For example, supposing that the speech data received from the user is "today's weather is well", a text may be obtained by performing the speech recognition on the speech data. At the same time, the mood recognition is performed on the speech data based on the pre-established mood recognition model. When the mood type corresponding to the speech data is the affirmative mood, the corresponding meaning may be determined as "just to state a fact that today is a well day" based on the mood type. After that, the dialogue content may be given to the user according to the text and the corresponding mood meaning. For example, corresponding dialogue content such as "That's great! We can go out for a walk" may be provided to the user. For another example, when the mood type corresponding to the speech data is the rhetorical mood, the corresponding meaning may be determined as "there is a doubt about the weather situation previously given, so it needs to be confirmed further" based on the mood type. Then, the dialogue content may be given to the user according to the text and the corresponding mood meaning. For example, corresponding dialogue content such as "The weather is really good today, with a temperature being 22° C. and a wind strength being 1 to 2, which is very suitable for going out" may be provided to the user. Thereby, by recognizing the mood of the user, and providing different responses for different moods, the dialogue is more lively.

With the mood recognition method according to an embodiment of the present disclosure, the speech data of the user may be received, the mood recognition may be performed on the speech data based on the pre-established mood recognition model when the speech recognition is performed on the speech data, and the user is provided with the response based on both the result of the speech recognition and the result of the mood recognition, such that the speech dialogue between the human and the machine is more lively, improving effect of speech recognition, and improving the availability and feasibility of the present disclosure.

Figure 5:
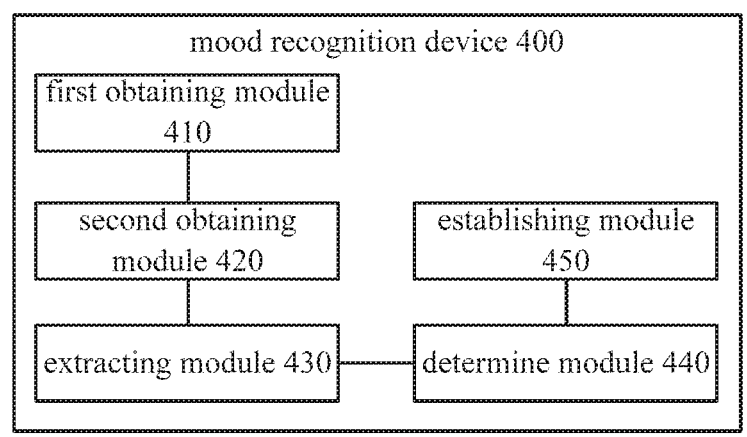
FIG. 5 is block diagram illustrating a mood recognition device according to an embodiment of the present disclosure.

Corresponding to the mood recognition method provided in above embodiments, an embodiment of the present disclosure further provides a mood recognition device. The mood recognition device corresponds to the mood recognition method provided in above embodiments, therefore, the foregoing implementations of the mood recognition method are applicable to the mood recognition device provided in this embodiment, which are not described in detail. FIG. 5 is block diagram illustrating the mood recognition device according to an embodiment of the present disclosure. As illustrated in FIG. 5, the mood recognition device 400 may include a first obtaining module 410, a second obtaining module 420, an extracting module 430, a determine module 440, and an establishing module 450.

The first obtaining module 410 is configured to obtain a sample text.

The second obtaining module 420 is configured to obtain a plurality of recordings corresponding to the sample text. The plurality of recordings are speech obtained by reading the sample text using a plurality of mood types. As an example, the plurality of mood types may include but not limit to an affirmative mood, an interrogative mood, a rhetorical mood and the like.

The extracting module 430 is configured to extract a mood feature from each of the plurality of recordings.

The determine module 440 is configured to determine a mood type corresponding to the mood feature.

The establishing module 450 configured to establish a mood recognition model based on the sample text, mood features extracted from the plurality of recordings, and mood types corresponding to the mood features.

Figure 6:
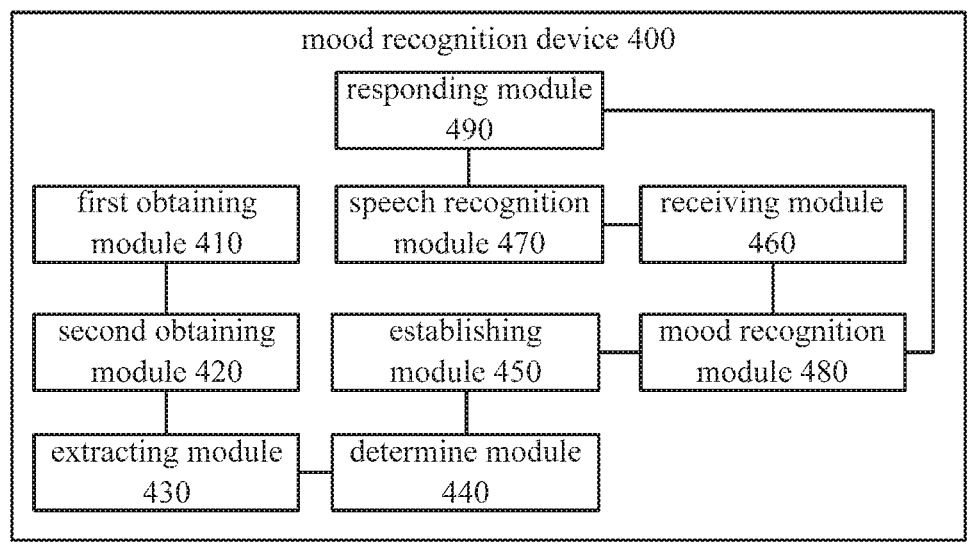
FIG. 6 is block diagram illustrating a mood recognition device according to another embodiment of the present disclosure.

In order to further improve availability and feasibility of the present disclosure, in some embodiments of the present disclosure, as illustrated in FIG. 6, the mood recognition device 400 may further include a receiving module 460, a speech recognition module 470, a mood recognition module 480, and a responding module 490.

The receiving module 460 is configured to receive speech data of a user.

The speech recognition module 470 is configured to perform speech recognition on the speech data to obtain a corresponding text.

The mood recognition module 480 is configured to perform mood recognition on the speech data based on the mood recognition model to obtain a corresponding mood meaning.

The responding module 490 is configured to provide a response to the user based on the text and the mood meaning.

Figure 7:
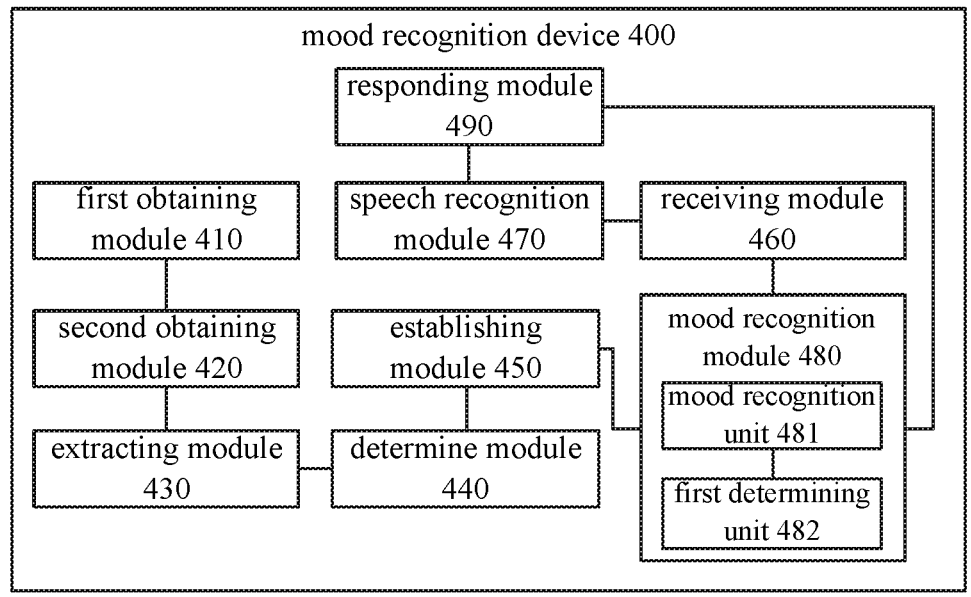
FIG. 7 is block diagram illustrating a mood recognition device according to yet another embodiment of the present disclosure.

As an exemplary implementation, as illustrated in FIG. 7, the mood recognition module 480 may include a mood recognition unit 481 and a first determining unit 482.

The mood recognition unit 481 configured to perform mood recognition on the speech data based on the mood recognition model to obtain a mood type corresponding to the speech data.

The first determining unit 482 is configured to determine the mood meaning according to the mood type.

Figure 8:
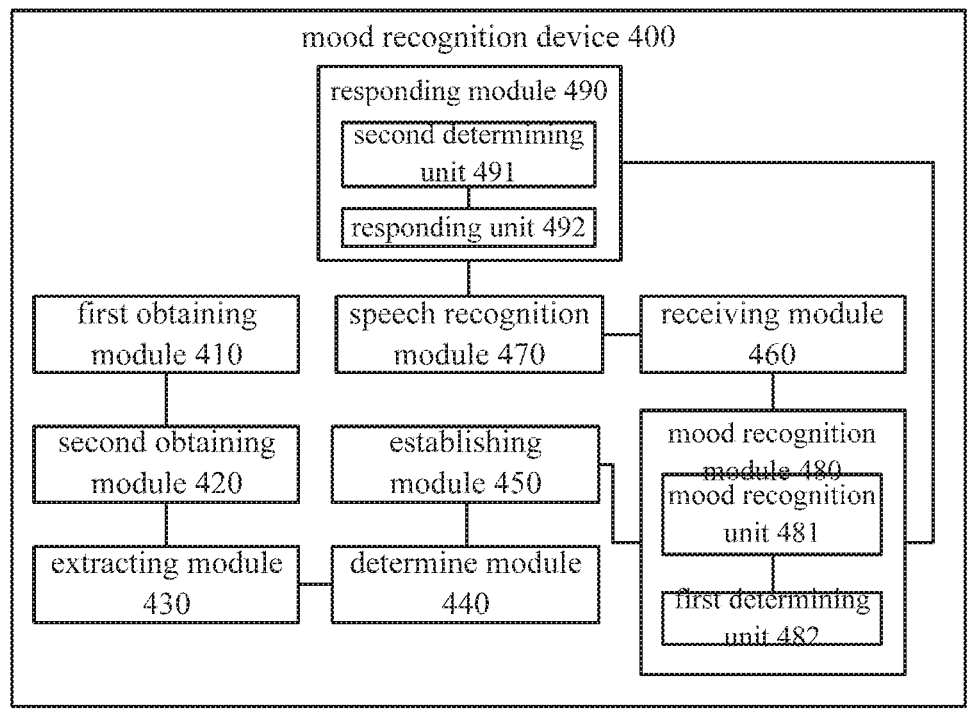
FIG. 8 is block diagram illustrating a mood recognition device according to still another embodiment of the present disclosure.

As an exemplary implementation, as illustrated in FIG. 8, the responding module 490 may include a second determining unit 491 and a responding unit 492.

The second determining unit 491 is configured to determine intention of the user based on the text and the mood meaning.

The responding unit 492 is configured to obtain response content based on the intention of the user, and to provide the response content to the user.

With the mood recognition device according to an embodiment of the present disclosure, the plurality of recordings may be obtained by reading the sample text using the plurality of mood types, the mood feature is extracted from each of the plurality of recordings, and the mood type corresponding to the mood feature is determined, finally, the mood recognition model is established based on the sample text, the mood features extracted from the plurality of recordings, and the mood types corresponding to the mood features, such that when speech recognition is performed on speech data input by a user in an online application, the mood recognition is performed on the speech data through the pre-established mood recognition model, realizing recognition of various types of moods in speech data, improving effect of the speech recognition, thus improving effect of speech dialogue between human and machine, and improving user experience.

To realize above embodiments, the present disclosure further provides an electronic device.

Figure 9:
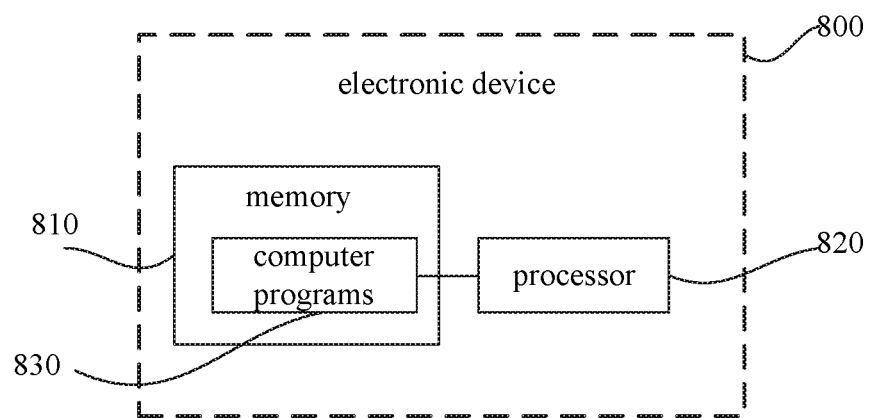
FIG. 9 is schematic diagram illustrating an electronic device according to an embodiment of the present disclosure.

FIG. 9 is schematic diagram illustrating an electronic device according to an embodiment of the present disclosure. As illustrated in FIG. 9, the electronic device 800 may include a memory 810, a processor 820, and computer programs 830 stored on the memory 810 and executable by the processor 820. When the processor 820 executes the computer programs 830, the processor 820 is caused to perform the mood recognition method according to any one of above mentioned embodiments.

To realize above embodiments, the present disclosure further provides a non-transitory computer-readable storage medium, having computer programs stored thereon, wherein when the computer programs are executed by a processor, the processor is caused to perform the mood recognition method according to any one of above mentioned embodiments.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, such as two or three, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, without contradicting each other, various embodiments or examples described in the specification, as well as features of various embodiments or examples, may be combined.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may not be performed in the order shown or described, for example, in a substantially simultaneous manner or in a reverse order, depending on the functions involved, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A mood recognition method, comprising:
   obtaining a sample text, the sample text having different semantic meanings when reading in different moods;
   obtaining a plurality of speech data corresponding to the sample text, wherein the plurality of speech data are obtained by reading the sample text using a plurality of mood types, wherein the plurality of mood types comprise an affirmative mood, an interrogative mood and a rhetorical mood, and the semantic meanings corresponding to the plurality of speech data are different when reading the sample text in different mood types;
   extracting an audio located at a pause or at the end of each of the plurality of speech data;
   extracting features from each audio as mood features, wherein the mood features comprise a rising intonation, a falling intonation, a rising-falling intonation, a falling-rising intonation or an even intonation;
   determining the mood types corresponding to the mood features;
   establishing a mood recognition model based on the sample text, the mood features extracted from the plurality of speech data, and the mood types corresponding to the mood features;
   receiving first speech data of a user;
   inputting the first speech data into the mood recognition model to obtain a first mood type of the first speech data;
   performing speech recognition on the first speech data to obtain a corresponding text; and
   providing a response to the user based on the corresponding text and the first mood type, the providing comprises:
   in response to the first mood type being the affirmative mood, providing the response to the user based on a fact stated by the corresponding text;
   in response to the first mood type being the interrogative mood, providing the response based on an answer of the corresponding text; and
   in response to the first mood type being the rhetorical mood, providing the response together with confirmation on a doubt about the corresponding text.

2. An electronic device, comprising a memory, a processor, and computer programs stored on the memory and executable by the processor, wherein when the processor executes the computer programs, the processor is caused to perform a mood recognition method, comprising:
   obtaining a sample text, the sample text having different semantic meanings when reading in different moods;
   obtaining a plurality of speech data corresponding to the sample text, wherein the plurality of speech data are obtained by reading the sample text using a plurality of mood types, wherein the plurality of mood types comprise an affirmative mood, an interrogative mood and a rhetorical mood, and the semantic meanings corresponding to the plurality of speech data are different when reading the sample text in different mood types;
extracting an audio located at a pause or at the end of each of the plurality of speech data;
extracting features from each audio as mood features, wherein the mood features comprise a rising intonation, a falling intonation, a rising-falling intonation, a falling-rising intonation or an even intonation;
determining the mood types corresponding to the mood features;
establishing a mood recognition model based on the sample text, the mood features extracted from the plurality of speech data, and the mood types corresponding to the mood features;
receiving first speech data of a user;
inputting the first speech data into the mood recognition model to obtain a first mood type of the first speech data;
performing speech recognition on the first speech data to obtain a corresponding text; and
providing a response to the user based on the corresponding text and the first mood type, the providing comprises:
in response to the first mood type being the affirmative mood, providing the response to the user based on a fact stated by the corresponding text;
in response to the first mood type being the interrogative mood, providing the response based on an answer of the corresponding text; and
in response to the first mood type being the rhetorical mood, providing the response together with confirmation on a doubt about the corresponding text.

3. A non-transitory computer-readable storage medium having computer programs stored thereon, wherein when the computer programs are executed by a processor, the processor is caused to perform a mood recognition method, comprising:
obtaining a sample text, the sample text having different semantic meanings when reading in different moods;
obtaining a plurality of speech data corresponding to the sample text, wherein the plurality of speech data are obtained by reading the sample text using a plurality of mood types, wherein the plurality of mood types comprise an affirmative mood, an interrogative mood and a rhetorical mood, and the semantic meanings corresponding to the plurality of speech data are different when reading the sample text in different mood types;
extracting an audio located at a pause or at the end of each of the plurality of speech data;
extracting features from each audio as mood features, wherein the mood features comprise a rising intonation, a falling intonation, a rising-falling intonation, a falling-rising intonation or an even intonation;
determining the mood types corresponding to the mood features;
establishing a mood recognition model based on the sample text, the mood features extracted from the plurality of speech data, and the mood types corresponding to the mood features;
receiving first speech data of a user;
inputting the first speech data into the mood recognition model to obtain a first mood type of the first speech data;
performing speech recognition on the first speech data to obtain a corresponding text; and
providing a response to the user based on the corresponding text and the first mood type, the providing comprises:
in response to the first mood type being the affirmative mood, providing the response to the user based on a fact stated by the corresponding text;
in response to the first mood type being the interrogative mood, providing the response based on an answer of the corresponding text; and
in response to the first mood type being the rhetorical mood, providing the response together with confirmation on a doubt about the corresponding text.

* * * * *